United States Patent [19]

Young

[11] Patent Number: 4,667,526

[45] Date of Patent: May 26, 1987

[54] CHANGE SPEED TRANSMISSION

[75] Inventor: Alastair J. Young, Kenilworth, United Kingdom

[73] Assignee: Automotive Products plc, Leamington Spa, England

[21] Appl. No.: 731,003

[22] Filed: May 6, 1985

[30] Foreign Application Priority Data

May 10, 1984 [GB] United Kingdom ................ 8411896

[51] Int. Cl.$^4$ ............................................. F16H 3/08
[52] U.S. Cl. ........................................ 74/331; 74/356; 74/359
[58] Field of Search ................ 74/701, 700, 330, 331, 74/329, 356, 359

[56] References Cited

U.S. PATENT DOCUMENTS

| | | | |
|---|---|---|---|
| 2,612,787 | 10/1952 | Youngren et al. | 74/331 X |
| 2,739,487 | 3/1956 | Winther | 74/330 |
| 2,991,661 | 7/1961 | Rambausek | 74/330 |
| 3,769,857 | 11/1973 | Whateley | 74/330 X |
| 4,116,082 | 9/1978 | Kelbel | 74/359 X |
| 4,461,188 | 7/1984 | Fisher | 74/356 X |
| 4,495,838 | 1/1985 | Gooch | 74/331 X |

*Primary Examiner*—Allan D. Herrmann
*Assistant Examiner*—Dirk Wright
*Attorney, Agent, or Firm*—Solon B. Kemon

[57] ABSTRACT

A transmission comprises first and second input shafts which are drivable respectively from independently operable first and second clutches. Gearing is provided which enables drive to be transmitted from the input shafts to an output via a layshaft. Further gearing is provided on a further layshaft for selection of reverse ratio. In reverse ratio the further gearing is in a drive path which includes the first and second input shafts. The further gearing includes synchronizer means to facilitate selection of reverse ratio.

2 Claims, 4 Drawing Figures

CHANGE SPEED TRANSMISSION

The invention relates to a transmission which is particularly, though not exclusively, for use in a motor vehicle.

Hitherto it has been known to provide a transmission comprising first and second input shafts drivable respectively from independently operable first and second clutches, a layshaft, gearing providing a series of speed ratios which permits drive to be transmitted from the input shafts to an output via the layshaft and a further layshaft carrying further gearing for selection of a reverse ratio. Such transmissions are known from GB Patent Nos. 795260 and 1349936. An obJect of the present invention is to provide an improved transmission of the foregoing kind.

According to one aspect of the present invention there is provided a transmission comprising first and second input shafts drivable respectively from independently operable first and second clutches, a layshaft, gearing providing a series of speed ratios which permits drive to be transmitted from the input shafts to an output via the layshaft and a further layshaft carrying further gearing including a gear wheel which is selectively connectable by synchroniser means to the further layshaft for selection of a reverse ratio.

By using synchroniser means to select reverse the driver of a vehicle is able to select reverse gear more easily without "crashing" the gearbox. This is most useful where rapid alternating selection of, say first and reverse ratio is required.

Preferably the further gearing is in a drive path which includes said first and second input shafts.

According to another aspect of the invention there is provided a transmission comprising first and second input shafts drivable respectively from independently operable first and second clutches, a layshaft, gearing providing a series of speed ratios which permits drive to be transmitted from the input shafts to an output via the layshaft and a further layshaft carrying further gearing for selection of a reverse ratio, the further gearing being in a drive path which includes the first and second input shafts.

The further gearing preferably comprises two gear wheels one of which meshes with a gear wheel on the first said layshaft which is in mesh with a gear wheel in the first input shaft and the other of which meshes with a gear wheel on the second input shaft. Preferably one of said gear wheels of said further gearing is rotatably fast with the further layshaft and the other of the gear wheels of said further gearing is selectively drivably connectable to its layshaft for selection of reverse ratio. With reverse ratio selected, the said gear wheel on the first layshaft may act as an idler gear between the said gear wheel on the first input shaft and the meshing gear of said further gearing.

Another layshaft may be provided and in such a case reverse drive may be transmitted to the output through gearing on the other layshaft. The said other layshaft preferably receives drive from a gear wheel on said second input shaft which meshes with a gear wheel on said other layshaft. Said gear wheel on the other layshaft may be selectively drivably connectable to its layshaft.

Preferably one of the first said layshaft and said other layshaft transmits drive to said output in a given ratio and drive to said output in two consecutive ratios is transmitted Lhrough one of the layshafts.

The first said layshaft and the said other layshaft may carry gear wheels which mesh with a common output gear wheel.

Transmissions in accordance with the invention will now be described by way of example with reference to the accompanying drawings in which.

Figure 1A:
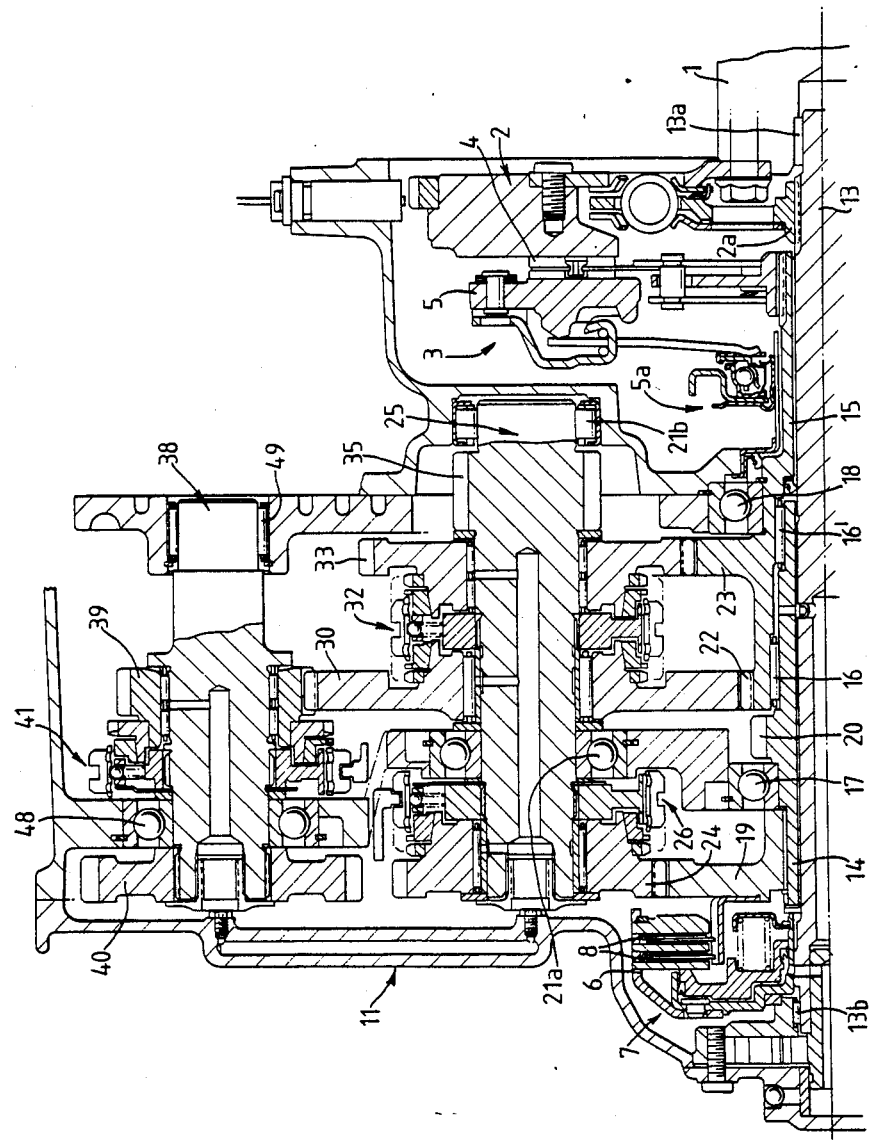
FIG. 1A is an elevation of half of a gearbox above the axis of input shafts.
Figure 1B:
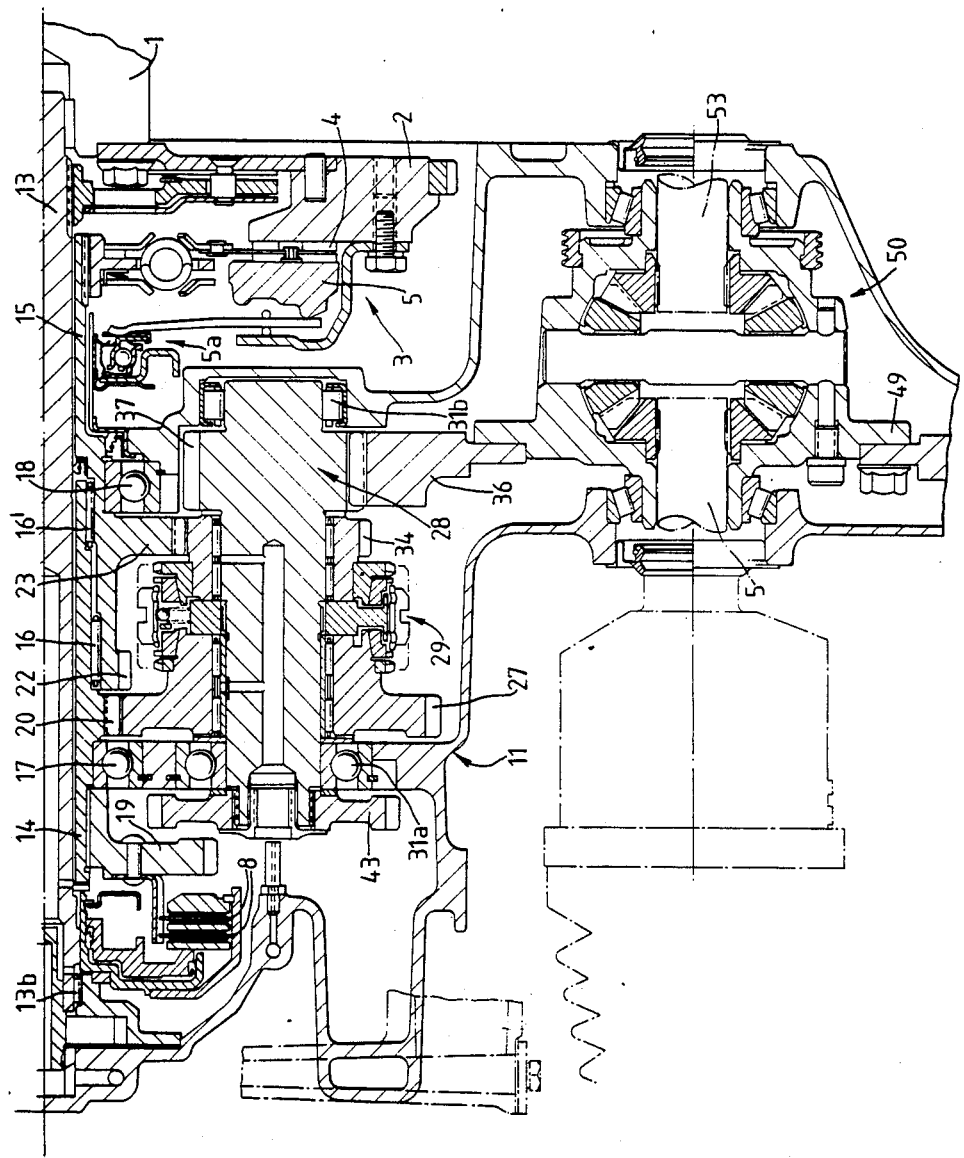
FIG. 1B is an elevation of the remaining half of the gearbox of FIG. 1A below the axis of the input shafts, the shafts and layshafts of FIGS. 1A and 1B being shown in the same plate for simplicity.

In FIGS. 1A and 1B drive from a prime mover (not shown) is transmitted via a shaft 1 to a resiliently mounted flywheel 2 which constitutes a driving member for a friction clutch 3 having a driven plate 4. A pressure plate 5 is provided which can be retracted by a release mechanism 5a in known manner to interrupt transmission of drive from the flywheel 2 to the driven plate 4. The flywheel 2 has a splined hub 2a which is drivably connected to the right hand end of a drive input member 13 drivably connected at its left-hand end as viewed in the drawings to a driving member 6 of a fluid-operable friction clutch 7. The clutch 7 has driven members 8 which are drivably connected by splines to a hollow input shaft 14 coaxial with input member 13. The driven plate 4 of the friction clutch 3 is drivably connected by splines to a hollow drive input shaft 15. The shaft 15 is coaxial with shaft 14 and axially spaced sets of roller bearings 16, 16' are located between them as shown. The shafts 14, 15 are journalled in main bearings 17, 18 mounted on a casing of the gearbox, the casing being indicated generally at 11. The right-hand end of member 13 is journalled in a bearing 13a in shaft 1 and its lefthand end is Journalled in bearings 13b supported by the casing 11.

The input shaft 14 has gear wheels 19,20 rotatably fast therewith and the input shaft 15 has gear wheels 22, 23 rotatably fast therewith.

Gear wheel 19 is in constant mesh with a gear wheel 24 rotatably mounted on a first layshaft 25, the gear wheel 24 being selectively drivably connectable to the layshaft 25 by a suitable synchroniser assembly 26. The layshaft 25 is rotatably mounted in bearings 21a, 21b on the casing 11.

Gear wheel 20 is in constant mesh with a gear wheel 27 rotatably mounted on a second layshaft 28, the gear wheel 27 being selectively drivably connectable to the layshaft 28 by a suitable synchroniser assembly 29. The layshaft 28 is Journalled in bearings 31a, 31b on the casing 11.

The gear wheel 22 is in constant mesh with a gear wheel 30 rotatably mounted on layshaft 25 and selectively drivably connectable to the layshaft 25 by a suitable synchroniser assembly 32.

The gear wheel 23 is in constant mesh with a gear wheel 33 rotatably mounted on layshaft 25 and a gear wheel 34 rotatably mounted on layshaft 28. The gear wheels 33, 34 are selectively drivably connectable to their respective layshafts 25, 28 by the synchroniser assemblies 32, 29.

Figure 3:
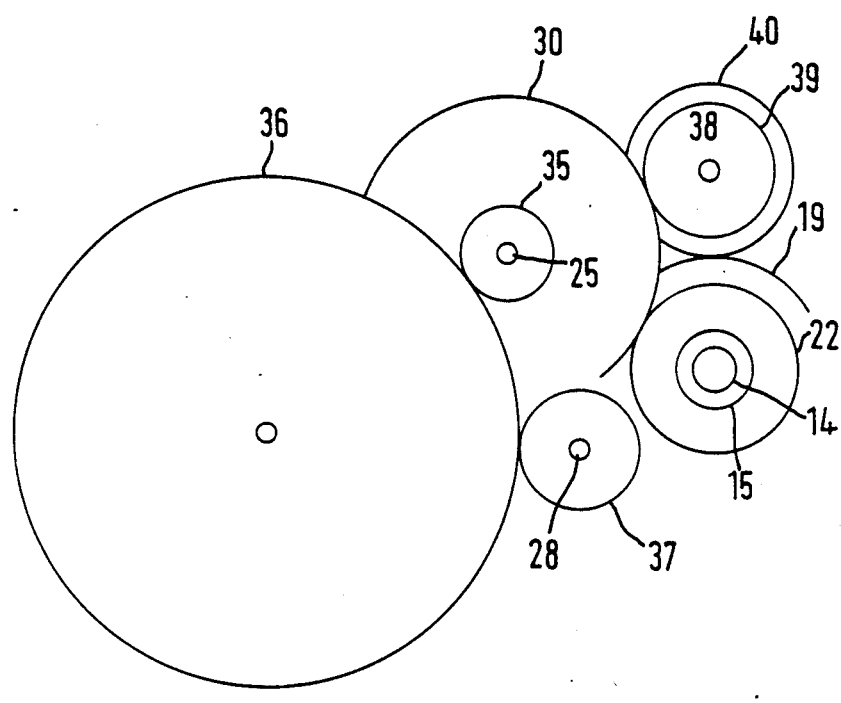
FIG. 3 is a diagrammatic end elevation to a larger scale of the tranmission of FIGS. 1a, 1B and showing a preferred orientation of the shafts.

The layshaft 25 is rotatably fast with a gear wheel 35 in constant mesh with a drive output gear wheel 36 (see FIG. 3) and the layshaft 28 is rotatably fast with a gear wheel 37 which is also in constant mesh with drive output gear wheel 36. The gear wheel 36 is bolted to a drive input member 49 of a differential gearing indicated generally at 50 for transmitting drive to output shafts 52, 53.

A third layshaft 38 is provided which carries two gear wheels 39, 40 for the selection of a reverse ratio. Gear wheel 39 is rotatably fast with layshaft 38 and in constant mesh with gear wheel 30. Gear wheel 40 is selectively drivably connectable to the layshaft 38 by a suitable synchroniser assembly 41 and is in constant mesh with gear wheel 19 (see FIG. 3). The layshaft 38 is journalled in bearings 48,49 on the casing 11.

A parking cog 43 engageable with a pawl (not shown) is provided in the layshaft 28.

Selection of ratios is controlled automatically by a control device (not shown) and the various drive paths from the clutch driven plates 10, 12 to the output gear wheel 36 in the various ratios will now be described.

First ratio is selected by moving synchroniser assembly 32 to the left to connect gear wheel 30 to layshaft 25. Clutch 3 is then engaged and drive is transmitted from clutch driven plate 4 through meshing gear wheels 22, 30 to layshaft 25 and from gear wheel 35 to output gear wheel 36.

Second ratio is preselected while driving in first ratio by moving synchroniser assembly 29 to the left to connect gear wheel 27 to layshaft 28. To engage second ratio clutch 3 is disengaged and clutch 7 is engaged so that drive is transmitted from clutch driven plates 8 through meshing gears 20, 27 to layshaft 28 and from gear wheel 37 to output gear wheel 36.

Third ratio is preselected while driving in second ratio by moving synchroniser assembly 32 to the right to disconnect gear wheel 30 and to connect gear wheel 33 to layshaft 25. To engage third ratio, clutch 7 is disengaged and clutch 3 is engaged so that drive is transmitted from clutch driven plate 4 through meshing gears 23, 33 to layshaft 25 and from gear wheel 35 to output gear wheel 36.

Fourth ratio is preselected while driving in third ratio by shifting synchroniser assembly 26 to the left to connect gear wheel 24 to layshaft 25. Fourth ratio is engaged by disengaging clutch 3 and engaging clutch 7 so that drive is transmitted from clutch driven plates 8 through meshing gear wheels 19, 24 to layshaft 25 and from gear wheel 35 to output gear wheel 36. It will be seen therefore that in the consecutive third and fourth ratios drive to output gear wheel 36 is transmitted via the first layshaft 25.

Fifth ratio is preselected while driving in fourth ratio by shifting syncrhroniser assembly 29 to the right to disconnect gear wheel 27 and to connect gear wheel 34 to layshaft 28. Fifth ratio is engaged by disengaging clutch 7 and engaging clutch 3 so that drive is transmitted from driven clutch plate 4 through meshing gears 23, 34 to layshaft 28 and from gear wheel 37 to output gear wheel 36.

Ratio downchanges may be effected in reverse order.

Reverse ratio is selected by shifting synchroniser assemblies 29, 41 to the left to connect gear wheel 27 to layshaft 28 and gear wheel 40 to the layshaft 38. Reverse drive is then obtained by engaging clutch 3 so that drive is transmitted through meshing gears 22, 30 and 39 to layshaft 38 (gear wheel 30 acting as an idler gear), drive from layshaft 38 being transmitted through meshing gear wheels 39, 19 to input shaft 14 and through meshing gear wheels 20, 27 to layshaft 28. Drive is then transmitted from gear heel 37 to output gear wheel 36. It can be seen that the reverse gearing forms a bridge between the gear wheel 22 fast with the input shaft 15 and the gear wheel 19 fast with the input shaft 14 whereby both input shafts 14, 15 are in the drive path in reverse gear.

Figure 2:
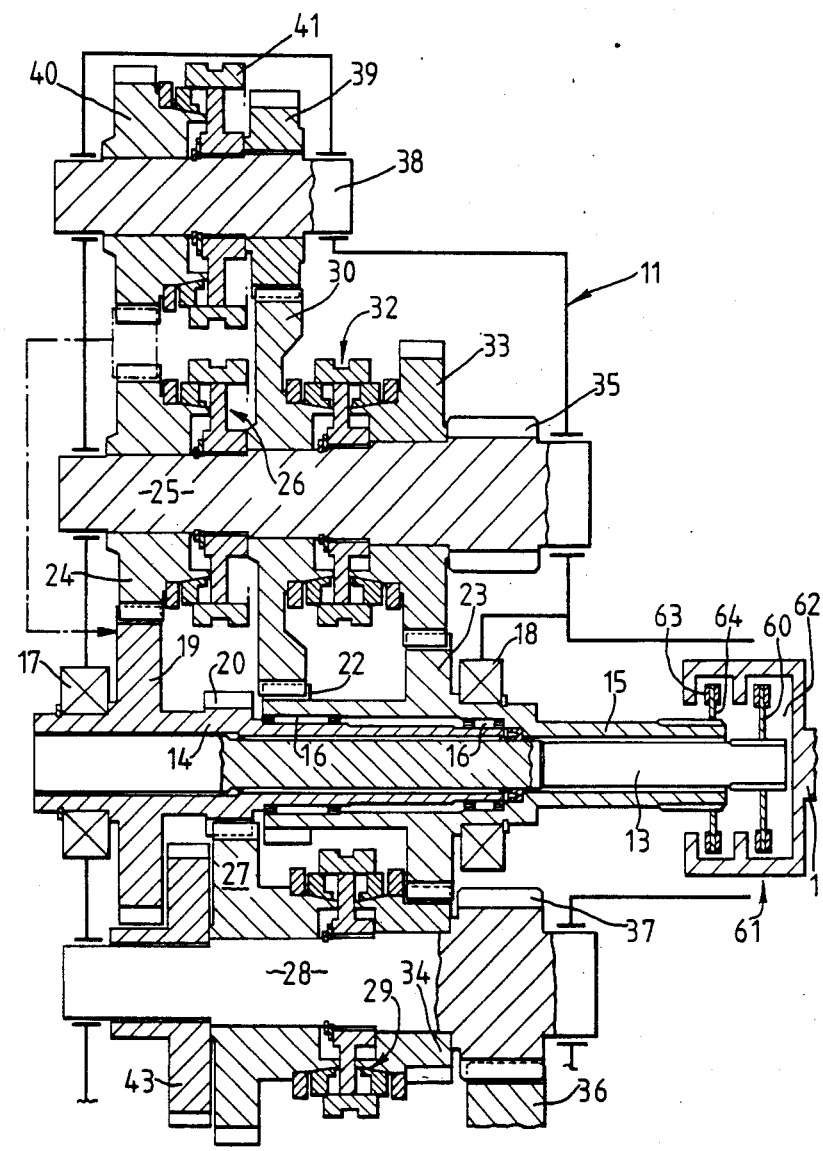
FIG. 2 is a diagrammatic elevation similar to FIG. 1 and showing an alternative transmission in accordance with the invention.

FIG. 2 illustrates an alternative gear box. In FIG. 2 the gear layout is the same as that in FIGS. 1A and 1B and components corresponding to components in FIGS. 1A and 1B carry the same reference numerals. Instead of the input member 13 being constantly drivably connected to the shaft 1 through the flywheel assembly 2, the right hand end of member 13 carries a driven member 60 of a clutch assembly 61 comprising first and second clutches 62,63. The clutch 62 is operable to drive driven member 60 and the clutch 62 is operable to drive a clutch driven member 64 drivably connected to shaft 15. The input member 13 is drivably connected e.g. splined to the input member 14 and the fluid operable clutch 7 is omitted. The ratios are selected in the same manner as in FIG. 1 except that drive input alternates between clutches 62, 63 instead of between clutches 3, 7.

Shafts 15,14, constitute the aforesaid, first and second input shafts respectively.

Typical values of the various gear wheels and typical ratios achieved are set out in the tables below:

| Gear wheel | No. of teeth |
|---|---|
| 19 | 53 |
| 20 | 23 |
| 22 | 26 |
| 23 | 43 |
| 24 | 43 |
| 27 | 52 |
| 30 | 71 |
| 33 | 52 |
| 34 | 30 |
| 35 | 20 |
| 36 | 103 |
| 37 | 25 |
| 39 | 31 |
| 40 | 42 |

| Selected ratio | No. of Teeth | Internal Ratio | Overall Ratio |
|---|---|---|---|
| 1 | 71/26 | 2.731 | 14.063 |
| 2 | 52/23 | 2.261 | 9.315 |
| 3 | 52/43 | 1.209 | 6.228 |
| 4 | 43/53 | 0.811 | 4.178 |
| 5 | 30/43 | 0.698 | 2.874 |
| REV | 31/26 53/42 52/23 | 3.402 | 14.015 |
| output gear 36/ layshaft gear 35 | 103/20 | 5.150 | — |
| output gear 36/ layshaft gear 37 | 103/25 | 4.120 | — |

Overall ratio is the internal ratio multiplied by the output gear/layshaft gear ratio when driving in the appropriate gear.

The transmission described is particularly compact both lengthwise and in end view. Moreover the use of a third layshaft 38 carrying a pair of idler gears 39, 40 for reverse ratio is particularly advantageous in facilitating selection of reverse in a simple and effective manner without the use of a sliding lay gear. The use of a synchroniser assembly 41 is also useful particularly in heavy vehicles where drivers occasionally need to shunt between a forward ratio and reverse when manuoevring. By using the synchroniser assembly 41 the all too common "crashing" when selecting reverse is avoided and reverse can be selected while the vehicle is still moving slowly forwards.

What I claim as my invention and desire to secure by Letters Patent in the United States is:

1. A transmission comprising first and second input shafts drivable respectively from independently operable first and second cluctches, a layshaft, geaaring providing a series of speed ratios which permit drive to be transmitted from the input shafts to an output via the layshaft, a further layshaft carrying further gearing including a gear wheel which is selectively drivably connectable to said further layshaft by synchronizer means for selection of a reverse ratio and another layshaft, drive in said reverse ratio being transmitted to the output through gearing on the other layshaft, the first said layshaft and said other layshaft carrying gear wheels which mesh with a common output gear wheel.

2. A transmission comprising first and second input shafts drivable respectively from independently operable first and second clutches, a layshaft, gearing providing a series of speed ratios which permits drive to be transmitted from the input shafts to an output via the layshaft a further layshaft carrying further gearing for selection of a reverse ratio, said further gearing being in a drive path which includes said first and second input shaft, and another layshaft, drive in said reverse ratio being transmitted to the output through gearing on the other layshaft the first said layshaft and said other layshaft carrying gear wheels which mesh with a common output gear wheel.

* * * * *